United States Patent [19]

Holloway

[11] Patent Number: 5,758,430
[45] Date of Patent: Jun. 2, 1998

[54] ELECTRICAL BOX INSTALLATION

[76] Inventor: Neil H. Holloway, 1906 8th Ave. N., Fort Dodge, Iowa 50501

[21] Appl. No.: 695,680

[22] Filed: Jul. 22, 1996

[51] Int. Cl.⁶ .............................. B25B 11/00; B25B 3/00; B25H 7/00
[52] U.S. Cl. ..................... 33/528; 33/DIG. 10; 269/904
[58] Field of Search ........................... 33/528, 613, 626, 33/645, DIG. 10; 269/904, 903, 1, 2, 3, 6, 86, 87, 87.1, 165; 52/DIG. 1, 105, 122.1, 126.1

[56] References Cited

U.S. PATENT DOCUMENTS

| | | | |
|---|---|---|---|
| 2,990,172 | 6/1961 | Gianotta | 33/DIG. 10 |
| 4,290,591 | 9/1981 | Smith | 33/DIG. 10 |
| 4,479,639 | 10/1984 | Kane | 33/DIG. 10 |
| 5,111,593 | 5/1992 | Gehen, Sr. | 33/DIG. 10 |
| 5,361,509 | 11/1994 | Wheeler, Sr. et al. | 33/528 |

*Primary Examiner*—Christopher W. Fulton

[57] ABSTRACT

An electrical box installation apparatus including a mast. The apparatus includes a gripper assembly comprised of a pivoting arm, a stationary arm, and a pivoting handle. The gripper assembly is coupled with the mast. A wallboard gauge is secured to the mast. The apparatus allows for a switchboard to be held securely in position as it is nailed to a framing member.

2 Claims, 3 Drawing Sheets

ELECTRICAL BOX INSTALLATION

BACKGROUND OF THE INVENTION

1. Field of the Invention

The present invention relates to an electrical box installation apparatus and more particularly pertains to holding an electrical box in place to allow for the electrical box to be nailed in place with an electrical box installation apparatus.

2. Description of the Prior Art

The use of electric box mounting devices is known in the prior art. More specifically, electric box mounting devices heretofore devised and utilized for the purpose of mounting electric boxes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,361,509 to Wheeler, Sr. et al. discloses an electrical box installation tool.

U.S. Pat. No. 4,890,391 to Warren discloses a commercial electrical box alignment tool.

U.S. Pat. No. Des. 317,575 to Ramsey discloses the ornamental design for a device for hanging suspended objects on a wall.

U.S. Pat. No. 5,072,523 to Bennett discloses an electrical box mounting tool.

U.S. Pat. No. 5,136,788 to Jackson discloses a locating device used with electrical outlet boxes and the like.

U.S. Pat. No. 5,222,303 to Jardine discloses a template for marking the location of junction boxes.

While these devices fulfill their respective, particular objective and requirements, the aforementioned patents do not describe an electrical box installation apparatus for holding an electrical box in place to allow for the electrical box to be nailed in place.

In this respect, the electrical box installation apparatus according to the present invention substantially departs from the conventional concepts and designs of the prior art, and in doing so provides an apparatus primarily developed for the purpose of holding an electrical box in place to allow for the electrical box to be nailed in place.

Therefore, it can be appreciated that there exists a continuing need for new and improved electrical box installation apparatus which can be used for holding an electrical box in place to allow for the electrical box to be nailed in place. In this regard, the present invention substantially fulfills this need.

SUMMARY OF THE INVENTION

In the view of the foregoing disadvantages inherent in the known types of electric box mounting devices now present in the prior art, the present invention provides an improved electrical box installation apparatus. As such, the general purpose of the present invention, which will be described subsequently in greater detail, is to provide a new and improved electrical box installation apparatus and method which has all the advantages of the prior art and none of the disadvantages.

To attain this, the present invention essentially comprises a mast of an elongated and cylindrical configuration. The mast has an open upper end and an externally threaded open lower end. The mast has a vertical slot therethrough downwardly of the open upper end thereof. The apparatus includes a gripper assembly comprised of a pivoting arm, a stationary arm, and a pivoting handle. The pivoting arm has an interior end and an exterior end. The pivoting arm is received through the vertical slot of the mast. A pivot pin extends through the mast and through the pivoting arm intermediate the interior and exterior ends thereof to facilitate pivoting of the pivoting arm relative to the mast. The stationary arm has an interior and an exterior end. The stationary arm receives the mast through a central portion thereof whereby the stationary arm is positioned below the pivoting arm. The stationary arm has a slot therethrough inwardly of the exterior end thereof. The pivoting handle has an upper end and a lower end. The upper end extends upwardly through the slot of the stationary arm for pivotal coupling with the exterior end of the pivoting arm. The lower end of the pivoting handle has a hand grip disposed thereon. The apparatus includes a wallboard gauge comprising a base planar member secured to the mast downwardly of the vertical slot therethrough. Angular planar members extend outwardly from opposing free ends of the base planar member. Outer planar members extend outwardly from free ends of the angular planar members whereby the outer planar members are parallel to the base planar member. The apparatus includes a mast extension of an elongated and cylindrical configuration. The mast extension has a diameter equal to a diameter of the mast. The mast extension has a tip member of a reduced diameter extending linearly from an upper end thereof. The tip member is receivable within the externally threaded open lower end of the mast. A threaded coupler is disposed on the upper end of the mast extension for coupling with the externally threaded open lower end of the mast to facilitate coupling of the mast extension with the mast.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical box installation apparatus which has all the advantages of the prior art electric box mounting devices and none of the disadvantages.

It is another object of the present invention to provide a new and improved electrical box installation apparatus which may be easily and efficiently manufactured and marketed.

It is a further object of the present invention to provide a new and improved electrical box installation apparatus which is of durable and reliable construction.

An even further object of the present invention is to provide a new and improved electrical box installation apparatus which is susceptible of a low cost of manufacture with regard to both materials and labor, and which accordingly is then susceptible of low prices of sale to the consuming public, thereby making such an electrical box installation apparatus economically available to the buying public.

Even still another object of the present invention is to provide a new and improved electrical box installation apparatus for holding an electrical box in place to allow for the electrical box to be nailed in place.

Lastly, it is an object of the present invention to provide a new and improved electrical box installation apparatus including a mast. The apparatus includes a gripper assembly comprised of a pivoting arm, a stationary arm, and a pivoting handle. The gripper assembly is coupled with the mast. A wallboard gauge is secured to the mast. The apparatus allows for a switchboard to be held securely in position as it is nailed to a framing member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
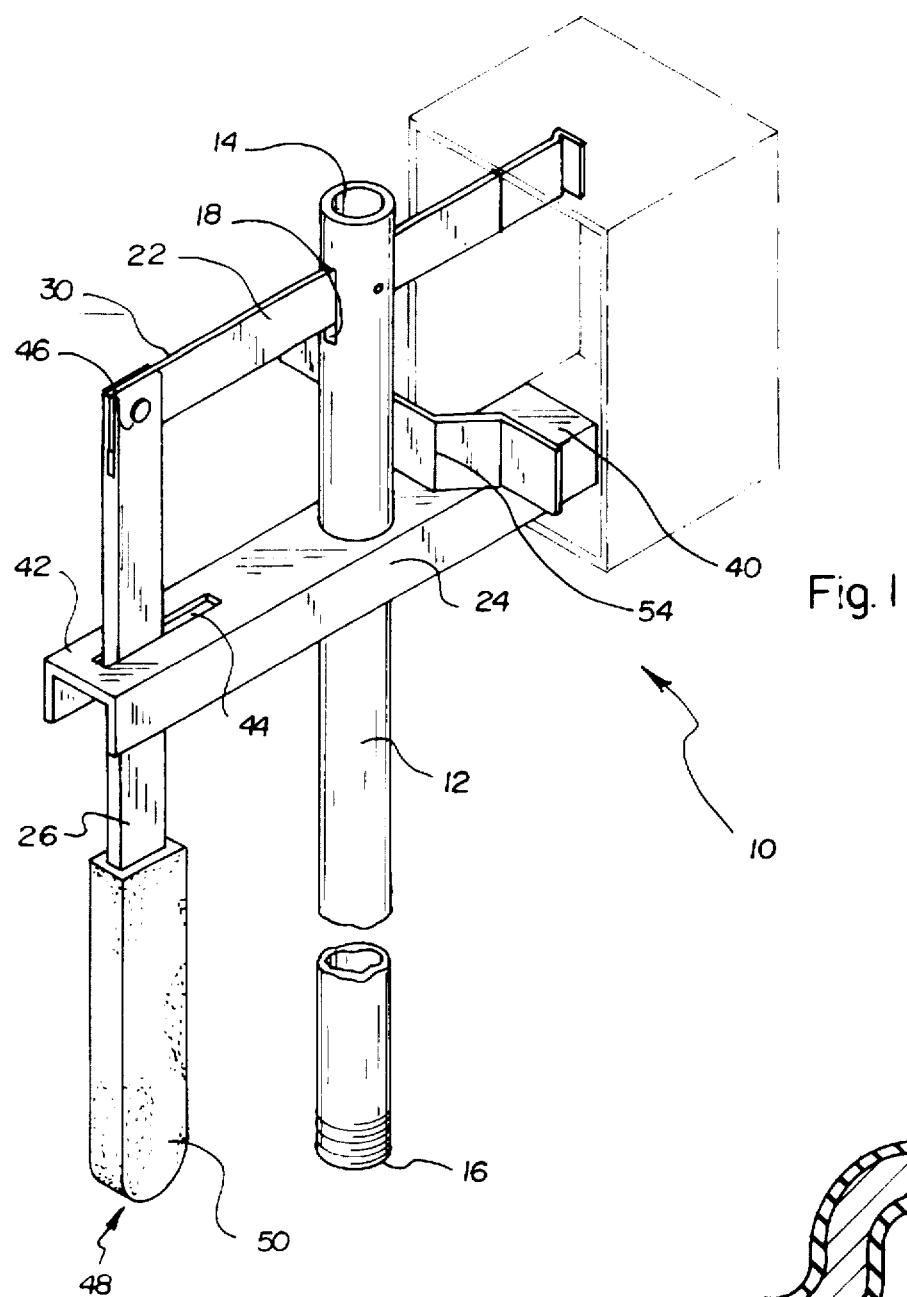
FIG. 1 is a perspective view of the preferred embodiment of the electrical box installation apparatus constructed in accordance with the principles of the present invention.
Figure 2:
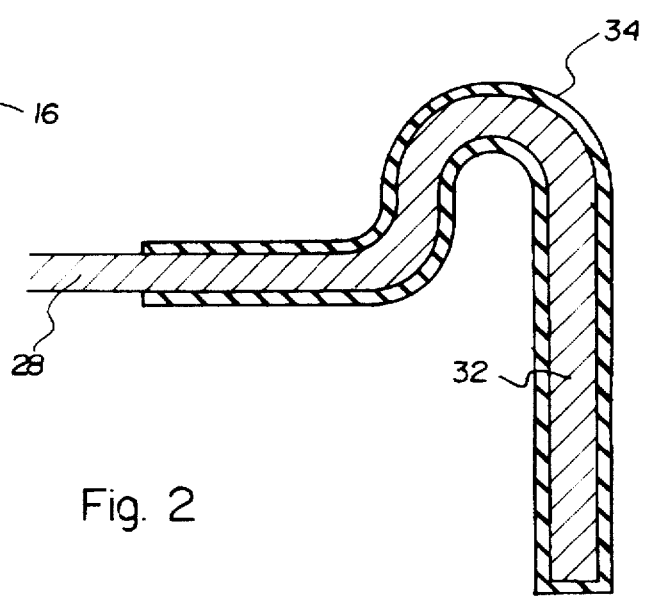
FIG. 2 is a plan view of the interior end of the pivoting arm of the gripper assembly.
Figure 3:
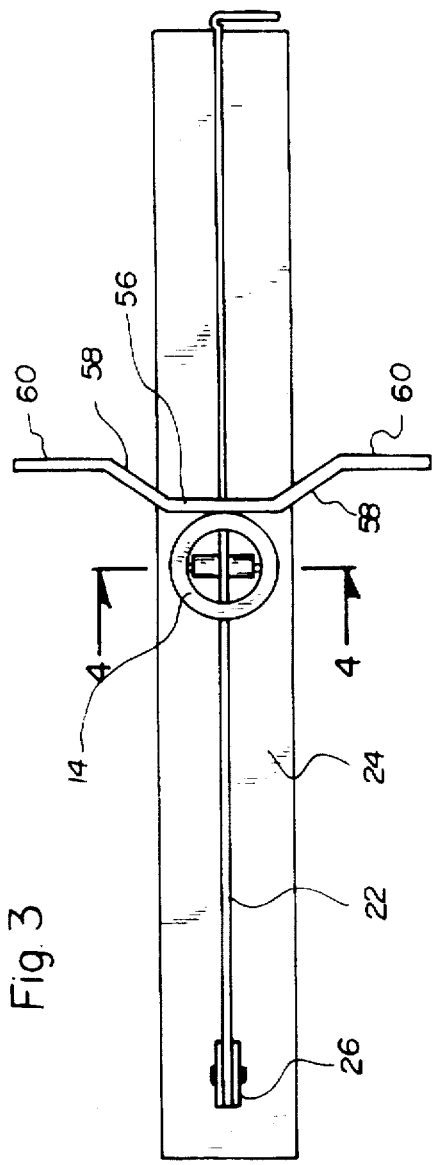
FIG. 3 is a plan view of the preferred embodiment of the present invention.
Figure 4:
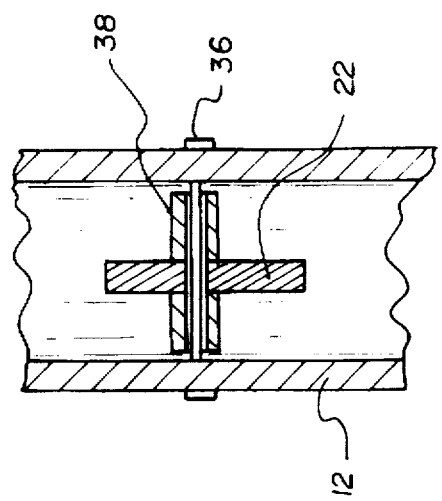
FIG. 4 is a cross-sectional view as taken along line 4—4 of FIG. 3.
Figure 5:
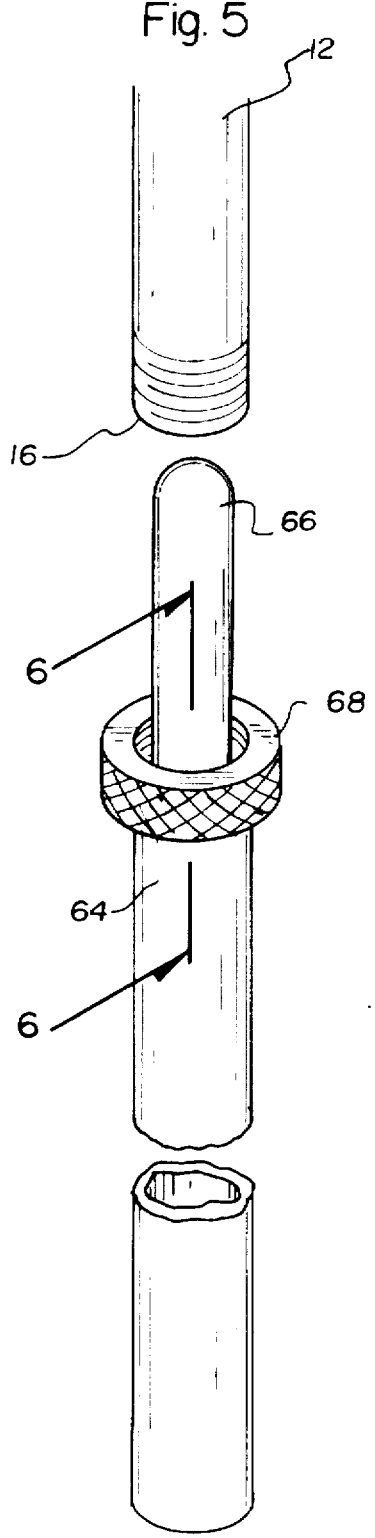
FIG. 5 is a front view of the mast extension of the present invention.
Figure 6:
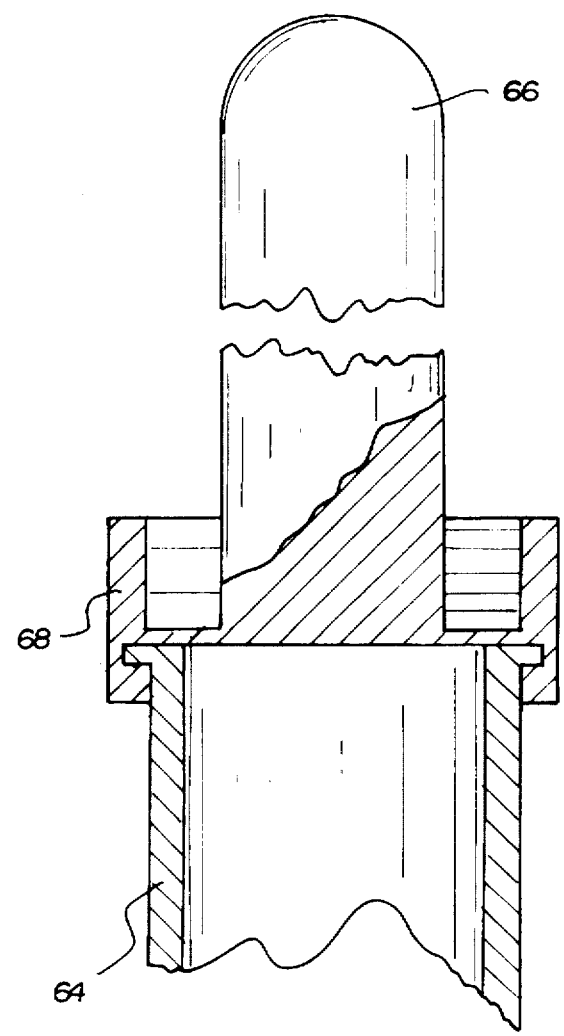
FIG. 6 is a cross-sectional view as taken along line 6—6 of FIG. 5.

With reference now to the drawings, and in particular, to FIGS. 1–6 thereof, the preferred embodiment of the new and improved electrical box installation apparatus embodying the principles and concepts of the present invention and generally designated by the reference number 10 will be described.

Specifically, it will be noted in the various Figures that the device relates to a electrical box installation apparatus for holding an electrical box in place to allow for the electrical box to be nailed in place. In its broadest context, the device consists of a mast, a gripping assembly, a wallboard gauge and a mast extension. Such components are individually configured and correlated with respect to each other so as to attain the desired objective.

The apparatus 10 includes a mast 12 of an elongated and cylindrical configuration. The mast 12 has an open upper end 14 and an externally threaded open lower end 16. The mast 12 has a vertical slot 18 therethrough downwardly of the open upper end 14 thereof. The mast 12 is preferably fabricated of a PVC pipe with a ½ inch diameter. The mast 12 could also be constructed so as to allow for its height to be adjusted to accommodate the heights of standard switchbox installation levels.

The apparatus 10 also includes a gripper assembly comprised of a pivoting arm 22, a stationary arm 24, and a pivoting handle 26. The pivoting arm 22 has an interior end 28 and an exterior end 30. The interior end 28 has a curved member 32 integral therewith. The curved member 32 has a rubber outer layer 34 disposed thereon. The pivoting arm 22 is received through the vertical slot 18 of the mast 12. A pivot pin 36 extends through the mast 12 and through the pivoting arm 22 intermediate the interior 28 and exterior ends 30 thereof to facilitate pivoting of the pivoting arm 22 relative to the mast 12. The pivot pin has a bushing 38 disposed therearound to ease the pivotability of the pivoting arm 22 relative to the mast 12. The stationary arm 24 has an interior end 40 and an exterior end 42. The stationary arm 24 receives the mast 12 through a central portion thereof whereby the stationary arm 24 is positioned below the pivoting arm 22. The stationary arm 24 has a slot 44 therethrough inwardly of the exterior end 42 thereof. The pivoting handle 26 has an upper end 46 and a lower end 48. The upper end 46 extends upwardly through the slot 44 of the stationary arm 24 for pivotal coupling with the exterior end 30 of the pivoting arm 22. The lower end 48 of the pivoting handle 26 has a hand grip 50 disposed thereon. In use, the interior end 40 of the stationary arm 24 fits inside a lower portion of the electrical box 100. The interior end 28 of the pivoting arm 22 presses against an inside top of the electrical box 100 when the hand grip 50 is pulled down. In this way, the electrical box 100 is held securely in position as it is nailed to a framing member.

Next, the apparatus 10 includes a wallboard gauge 54 comprising a base planar member 56 secured to the mast 12 downwardly of the vertical slot 18 therethrough. Angular planar members 58 extend outwardly from opposing free ends of the base planar member 56. Outer planar members 60 extend outwardly from free ends of the angular planar members 58 whereby the outer planar members 60 are parallel to the base planar member 56. The wallboard gauge 54 functions as a depth gauge for setting the electric box 100 to sit flush with the wallboard surface. When the wallboard gauge 54 is pressed against a face of the framing member, the electric box 100 will automatically be positioned correctly.

Lastly, the apparatus 10 includes a mast extension 64 of an elongated and cylindrical configuration. The mast extension 64 has a diameter equal to a diameter of the mast 12. The mast extension 64 has a tip member 66 of a reduced diameter extending linearly from an upper end thereof. The tip member 66 is receivable within the externally threaded open lower end 16 of the mast 12. A threaded coupler 68 is disposed on the upper end of the mast extension 64 for coupling with the externally threaded open lower end 16 of the mast 12 to facilitate coupling of the mast extension 64 with the mast 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by letters patent of the united states is as follows:

1. An electrical box installation apparatus for holding an electrical box in place to allow for the electrical box to be nailed in place comprising, in combination:

a mast of an elongated and cylindrical configuration, the mast having an open upper end and an externally threaded open lower end, the mast having a vertical slot therethrough downwardly of the open upper end thereof;

a gripper assembly comprising a pivoting arm, a stationary arm, and a pivoting handle, the pivoting arm having an interior end and an exterior end, the pivoting arm being received through the vertical slot of the mast, a pivot pin extends through the mast and through the pivoting arm intermediate the interior and exterior ends thereof to facilitate pivoting of the pivoting arm relative to the mast, the stationary arm having an interior and an exterior end, the stationary arm receiving the mast through a central portion thereof whereby the stationary arm being positioned below the pivoting arm, the stationary arm having a slot therethrough inwardly of the exterior end thereof, the pivoting handle having an upper end and a lower end, the upper end extending upwardly through the slot of the stationary arm for pivotal coupling with the exterior end of the pivoting arm, the lower end of the pivoting handle having a hand grip disposed thereon;

a wallboard gauge comprising a base planar member secured to the mast downwardly of the vertical slot therethrough, angular planar members extend outwardly from opposing free ends of the base planar member, outer planar members extend outwardly from free ends of the angular planar members whereby the outer planar members being parallel to the base planar member;

a mast extension of an elongated and cylindrical configuration, the mast extension having a diameter equal to a diameter of the mast, the mast extension having a tip member of a reduced diameter extending linearly from an upper end thereof, the tip member being receivable within the externally threaded open lower end of the mast, a threaded coupler disposed on the upper end of the mast extension coupling with the externally threaded open lower end of the mast to facilitate coupling of the mast extension with the mast.

2. An electrical box installation apparatus comprising:

a mast;

a gripper assembly comprising a pivoting arm, a stationary arm, and a pivoting handle, the gripper assembly coupled with the mast;

a wallboard gauge secured to the mast;

wherein the pivoting arm having an interior end and an exterior end, the pivoting arm being received through a vertical slot of the mast, a pivot pin extends through the mast and through the pivoting arm intermediate the interior and exterior ends thereof to facilitate pivoting of the pivoting arm relative to the mast, the stationary arm having an interior and an exterior end, the stationary arm receiving the mast through a central portion thereof whereby the stationary arm being positioned below the pivoting arm, the stationary arm having a slot therethrough inwardly of the exterior end thereof, the pivoting handle having an upper end and a lower end, the upper end extending upwardly through the slot of the stationary arm for pivotal coupling with the exterior end of the pivoting arm, the lower end of the pivoting handle having a hand grip disposed thereon.

* * * * *